(12) United States Patent
Meinds et al.

(10) Patent No.: US 8,411,099 B2
(45) Date of Patent: Apr. 2, 2013

(54) COMPUTER GRAPHICS PROCESSOR AND METHOD OF RENDERING IMAGES

(75) Inventors: Kornelis Meinds, Eindhoven (NL); Bart Gerard Bernard Barenbrug, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 358 days.

(21) Appl. No.: 10/584,501

(22) PCT Filed: Dec. 21, 2004

(86) PCT No.: PCT/IB2004/052872
§ 371 (c)(1),
(2), (4) Date: Jun. 22, 2006

(87) PCT Pub. No.: WO2005/064541
PCT Pub. Date: Jul. 14, 2005

(65) Prior Publication Data
US 2007/0146381 A1    Jun. 28, 2007

(30) Foreign Application Priority Data
Dec. 23, 2003    (EP) .................... 03104947

(51) Int. Cl.
*G09G 5/02*    (2006.01)
*G09G 5/00*    (2006.01)
(52) U.S. Cl. ........ 345/589; 345/582; 345/418; 345/611; 345/619
(58) Field of Classification Search .......... 345/611, 345/619
See application file for complete search history.

(56) References Cited

U.S. PATENT DOCUMENTS

| | | | | |
|---|---|---|---|---|
| 5,175,808 | A | * | 12/1992 | Sayre .......................... 345/647 |
| 5,204,944 | A | * | 4/1993 | Wolberg et al. ................ 345/427 |
| 5,977,977 | A | * | 11/1999 | Kajiya et al. .................. 345/418 |
| 6,081,615 | A | | 6/2000 | Yasui |
| 6,111,585 | A | | 8/2000 | Choi |
| 6,215,496 | B1 | | 4/2001 | Szeliski et al. |

(Continued)

FOREIGN PATENT DOCUMENTS

| | | |
|---|---|---|
| CN | 1212412 A | 3/1999 |
| EP | 1 489 560 A1 | 12/2004 |

(Continued)

OTHER PUBLICATIONS

Ren et al., Object Space EWA Surface Splatting: A Hardware Accelerated Approach to High Quality Point Rendering, pp. 461-470, Eurographics, vol. 21, 2002.*

(Continued)

*Primary Examiner* — M Good Johnson
(74) *Attorney, Agent, or Firm* — Bruce Greenhaus; Duane Morris LLP

(57) ABSTRACT

Therefore, a computer graphics processor with a forward mapping renderer is provided. The renderer comprises a texture space rasterizer (TS) for rasterizing a primitive in texture space, a color generating unit (PS) for determining the color of the output of the texture space rasterizer (TS) and for forwarding a color sample along with coordinates, a 2 pass screen space resampler (SSR1, SSR2) for resampling the color sample determined by the color generating unit (PS), and at least one one-dimensional blur filter unit (1PB, 2PB) associated to at least one pass of said screen space resampler (SSR1, SSR2) for performing a one-dimensional filtering before performing said at least one pass.

14 Claims, 7 Drawing Sheets

U.S. PATENT DOCUMENTS

| | | | |
|---|---|---|---|
| 6,452,595 B1 | 9/2002 | Molnar et al. | |
| 6,674,430 B1* | 1/2004 | Kaufman et al. | 345/419 |
| 6,744,435 B2* | 6/2004 | Zwicker et al. | 345/424 |
| 6,760,037 B2* | 7/2004 | Kallay et al. | 345/619 |
| 6,825,850 B2* | 11/2004 | Wang et al. | 345/582 |
| 6,985,156 B2* | 1/2006 | Wang et al. | 345/582 |
| 6,999,095 B2* | 2/2006 | Wang et al. | 345/582 |
| 6,999,100 B1* | 2/2006 | Leather et al. | 345/611 |
| 7,064,770 B2* | 6/2006 | Lachine et al. | 345/611 |
| 2004/0012563 A1* | 1/2004 | Papakipos et al. | 345/157 |
| 2004/0012603 A1* | 1/2004 | Pfister et al. | 345/582 |
| 2005/0093877 A1* | 5/2005 | Wang et al. | 345/582 |

FOREIGN PATENT DOCUMENTS

| | | |
|---|---|---|
| JP | 59127789 A | 7/1984 |
| JP | 02-059975 | 2/1990 |
| JP | 03-071275 | 3/1991 |
| JP | 2002-520748 | 7/2002 |
| JP | 2003-515851 | 5/2003 |
| WO | WO 00/04505 | 1/2000 |
| WO | WO 00/04505 | 1/2001 |
| WO | WO 01/41069 | 6/2001 |
| WO | WO 03/065307 | 8/2003 |
| WO | WO 03/065308 | 8/2003 |

OTHER PUBLICATIONS

Zwicker et al., Surface Splatting, ACM SIGGRAPH, Aug. 12-17, 2001, pp. 371-378.*

Oliveira et al., Relief Texture Mapping, ACM SIGGRAPH, 2000, pp. 359-368.*

Lacroute et al., Fast Volume Rendering Using a Shear-Warp Factorization of the Viewing Transformation, ACM SIGGRAPH, Jul. 24-29, 1994, pp. 451-458.*

Heckbert, Fundamentals of Texture Mapping and Image Warping, Master's Thesis, University of California, Berkeley, CA, Jun. 17, 1989, 94 pages.*

Loenen et al., Edge Anti-aliased Two Pass Forward Texture Mapping, Aug. 22, 2000, 51 pages.*

Edwin Catmull: "3-D Transformations of Images in Scanline Order"; Computer Graphics (SIGGRAPH '80 Proceedings); 1980; vol. 14 (3); pp. 279-285.

Smith Alvy Ray : "Planar 2-Pass Texture Mapping and Wraping"; Computer Graphics (Proceedings SIGGRAPH 1987); vol. 21 (4); Jul. 1987 pp. 263-272.

Dachille F et al: "High-Degree Temporal Antialiasing" Proceedings Computer Animation 2000—Philadelphia, PA, USA; May 3, 2000; pp. 49-54.

Wolberg George et al. :"Separable Image Wraping With Spatial Lookup Table"; Computer Graphics (Proc. SIGGRAPH '89); vol. 23(3) pp. 369-378; Jul. 1989.

Heckbert, P.S., Survey of Texture Mapping, IEEE Computer Graphics and Applications, 1986, vol. 6, No. 11, New York, NY, pp. 56-67.

Patent abstract of JP 02-059975, publication date: Feb. 28, 1990, Patent Abstracts of Japan, 1 page.

Patent abstract of JP 03-071275, publication date: Mar. 27, 1991, Patent Abstracts of Japan, 1 page.

Patent abstract of JP 2002-520748, publication date: Jul. 9, 2002, Espacenet.com, Mar. 22, 2011, 1 page.

Patent abstract of JP 2003-515851, publication date May 7, 2003, Espacenet.com, Mar. 22, 2011, 1 page.

Meinds, K., et al., "Real-time temporal anti-aliasing for 3D graphics," Vision, Modeling, and Visualization 2003 (pp. 337-344).

B. Barenbrug, "Pixel Shading and Forward Texture Mapping," Graphics Hardware 2003, Eurographics Workshop Proceedings, pp. 345-353, Nov. 19-21, 2003.

Meinds, K., et al., "Resample Hardware for 3D Graphics," Graphics Hardware 2002, Eurographics Workshop Proceedings, pp. 17-26.

* cited by examiner

COMPUTER GRAPHICS PROCESSOR AND METHOD OF RENDERING IMAGES

BACKGROUND OF THE INVENTION

In the area of computer graphics and video processing, there is a constant effort to improve the rendering capabilities of such systems to achieve more realistic images with less computational effort.

Traditionally, texture mapping onto projections of 3D surfaces have been performed by inverse mapping from an area of the pixel onto surface texture. An alternative approach is shown in "3-d transformations of images in scanline order" by Edwin Catmull and Alvy Ray Smith, In Computer Graphics (SIGGRAPH '80 Proceedings), volume 14(3), pages 279-285, 1980. The texture surface is transformed as a 2D image until it conforms to a projection of a polygon placed arbitrarily in 3D space. This 2D transformation or mapping can be decomposed into a sequence of two orthogonal 1D transformations, namely in a horizontal and in a vertical scanline order. In other words, multi-dimensional image transformations of resampling operations can be executed as a sequence of one dimensional transformation.

However, one problem, that may arise within such a sequence of 1D transformations, is the occurrence of aliasing due to shear. The shear problem is illustrated in FIG. 1 showing two lines of a texture map (left side of FIG. 1) and an intermediate image (right side of FIG. 1). The texture map has a black vertical line (at u=1), and the shear due to the perspective mapping is uttered such that the black pixel in the second line is shifted five pixels more to the right (x=6) than the black pixel on the first line (x=1). In order to prevent such horizontal aliasing, a horizontal filter pass is performed, which however can not prevent vertical aliasing. The shear causes a very sharp transition between black pixels in one line, and white pixels in the next. Also, the line in the intermediate image consists of disjunctive parts, separated by columns to which the line does not contribute (e.g. for x=3).

One solution to the shear problem is the so-called super-sampling technique proposed by George Wolberg and Terrance E. Boult in "Separable image warping with spatial lookup tables", in Computer Graphics (Proc. Siggraph '89), volume 23(3), pages 369-378, July 1989. Accordingly, the problem of aliasing occurs due to an under-sampling, so that a suggested solution is to increase the resolution by sampling the mapping function more densely. Therefore, the rasterisation is performed at a finer resolution (i.e. it is super-sampled), causing extra intermediate lines to be generated, with a black pixel at intermediate positions filling the holes. If this is done for shear introduced by a first pass, the second pass will down-scale the larger intermediate image to its final resolution. If shear in the second pass would be treated using the same supersampling approach, a third pass would be needed to reduce the generated higher horizontal resolution to the output resolution. Accordingly, the super-sampling technique is a compute intensive approach.

Another approach to overcome the aliasing problem is based on a box filtering technique as described by Alvy Ray Smith, in "Planar 2-pass texture mapping and warping", in Computer Graphics (Proceedings Siggraph 1987), volume 21(4), pages 263-272, 1987. Here, prefiltering is applied and constitutes a process of checking whether a pixel is inside e.g. a triangle (for the case of inverse mapping). The prefilter may have a delta function, a box function or the like. Without prefiltering each texel in the input texture is either mapped to screen space or not depending whether its position lies within the triangle. A prefilter is used to determine which texels should contribute to a subsequent resampling, i.e. also possibly those not totally inside the triangle, in order to reduce edge aliasing. An amount of overlap is determined between the triangle and a footprint of the prefilter, wherein the footprint of a prefilter corresponds to the area of the prefilter in the u/v directions in texture space.

FIG. 2 shows an illustration of an output pixel footprint mapped to the input image. The left side of FIG. 2 shows a texture map 76, i.e. texels, in texture space, while the right side of FIG. 2 shows an intermediate image after horizontal transformation 77, i.e. pixels. The texture comprises a vertical column of grey texels 74. In the texture space, the square 72 depicts a box reconstructed footprint of a texel, ML the midline, 75 white texels and 73 a mapped box reconstructed prefilter footprint of a pixel. A box prefilter footprint of a pixel on a scanline 78 is shown in screen space. Accordingly, the footprint 78 of a box prefilter of the pixel on a scanline, indicated by the midline ML, is mapped to the texture space 76 and constitutes the mapped box reconstruction prefilter footprint.

In FIG. 2 a horizontal span of output pixels are modeled as a row of neighboring squares representing footprints of a box prefilter. The footprint 73 of these pixels mapped to the scanline of the input image constitutes an area limited above and below by parallel line segments and left and right by curves and in particular straight lines for some transformations as shown in FIG. 2.

The pixel color being box filtered is composed of the average of the texel colors whose footprints of the box reconstruction filter intersects the mapped footprint 73 of the pixel. A weighting function is performed on the texels in accordance of the size of the footprint area of the reconstruction filter 72 intersecting with the pixel's mapped footprint 73, i.e. in accordance with the area overlap of the footprint area of the reconstruction filter and the footprint of the mapped pixel. Although, a more accurate average can thus be achieved than a strictly 1D average over the midline ML of these areas (selecting only the dark texel to contribute in FIG. 2), 2D computations (i.e. area overlap calculation) are required within the 1D scanline computations, resulting in a compute intensive technique.

SUMMARY OF THE INVENTION

It is therefore an object of the invention to provide a computer graphics processor and a method of rendering images which are capable of further reducing aliasing due to shear with moderate computing requirements.

This object is solved by a computer graphics processor according to claim 1 and a method of rendering according to claim 8.

Therefore, a computer graphics processor with a forward mapping renderer is provided. The renderer comprises a texture space rasterizer TS for rasterizing a primitive in texture space, a color generating unit PS for determining the color of the output of the texture space rasterizer TS and for forwarding a color sample along with coordinates, a 2-pass screen space resampler SSR1, SSR2 for resampling the color sample determined by the color generating unit PS, and at least one one-dimensional blur filter unit 1PB, 2PB associated to at least one pass of said screen space resampler SSR1, SSR2 for performing a 1D filtering before performing at least one pass.

Therefore, only 1D calculations need to be performed during the resampling operation. In order to avoid the gaps shown in FIG. 1, whose lines, that are perpendicular to the shear direction, are smeared over more pixels. This can be achieved by a blur filter which provides a good approximation of the necessary 2D filtering.

According to an aspect of the invention, said processor comprises a first and second one-dimensional blur filter unit. Said screen space resampler comprises a first pass and a second pass screen space resampler. Said first blur filter unit is arranged before said first pass screen space resampler and said second blur filter unit is arranged before a second pass screen space resampler. Accordingly, the blur may be applied to both passes.

According to a preferred aspect of the invention said first and second blur filter units are one-dimensional blur filters having footprints with a size depending on a corresponding shear factor, so that more blur may be introduced when there is more shear. Thus aliasing due to shear is effectively prevented.

According to a further aspect of the invention, said first and second blur filter units are box low pass filter having a weighted footprint. With such a footprint the contribution of a 2D footprint may be approximated more efficiently.

The invention also relates to a method of rendering images based on a forward mapping rendering. A primitive is rasterized in texture space. The color of the output of the rasterizing step is determined and a color sample is forwarded along with coordinates. A 2-pass screen space resampling of the color sample determined in the color generating step is performed. At least one one-dimensional blur filtering is performed before performing at least one pass resampling.

The invention furthermore relates to a computer program product comprising program code means stored on a computer readable medium for performing an above method when said program is run on a computer Further aspects of the invention are defined in the dependent claims.

The invention is based on the idea to avoid the computation of an area overlap of the texel's footprint with the mapped footprint of a pixel, i.e. a 2D computation. Instead only 1D computations are used by applying a 1D filter to the texel.

DETAILED DESCRIPTION OF PREFERRED EMBODIMENTS

Figure 3:
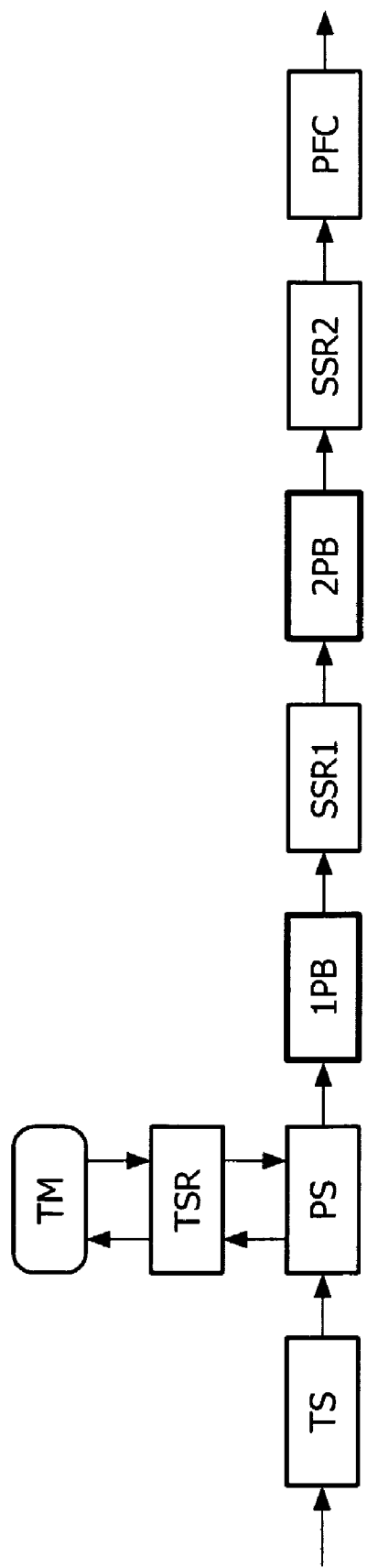
FIG. 3 shows a forward mapping pipeline according to a first embodiment of the invention.

FIG. 3 shows a forward mapping pipeline according to a first embodiment of the invention. This forward mapping pipeline comprises a texture space rasterizer TS, a texture memory TM, a texture space resampler TSR, a pixel shader PS, a first pass and a second pass blur unit 1PB, 2PB, a first pass and a second pass screen space resampler SSR1, SSR2, and a pixel fragment combiner PFC.

First of all, the basic operation of the forward rendering pipeline is described. The rasterization is performed in texture space and the texture space rasterizer TS traverses a projection of a primitive onto a texture map by selecting texture coordinates as variables for the rasterization process. The texture space rasterizer TS may traverse the texture map on a texture grid. Texels being confined with the primitive or polygon being rasterized are to be splat on pixels in screen space.

Therefore, the pixel shader PS and the texture space resampler TSR (of which there may be one or more, for serial or parallel fetching of texture samples, if several textures are present) correspond to those in a traditional pipeline. The pixel shader PS receives a set of (interpolated) attributes, including texture and screen coordinates, for one location. The texture coordinates, along with the shading program, determine where to index the texture maps via the texture space resampler TSR. The shader can also modify texture coordinates before sending them to the texture space resampler TSR to implement dependent texturing, as in the same way as in a traditional pipeline.

The shader PS passes the shaded color on to the screen space resampler SSR, along with the associated screen coordinates. These in general are not integer, but this is similar to how a pixel shader in a traditional pixel shader pipeline might receive sub-pixel screen positions when performing supersampling. The screen space resampler SSR splats the mapped texels to integer screen positions, so that an image of the primitive is provided on the screen. The pixel fragments from the screen space resampler SSR may be combined in the pixel fragment combiner PFC.

The shaded color sample resulting from the pixel shading process is forwarded to the screen space resampler SSR along with its screen coordinates. The screen space resampler SSR resamples these color samples, (located generally at non-integer pixel positions) to the integer pixel positions needed for display.

The screen space resampling is now described in more detail. The approach to reduce the aliasing due to shear in the screen space resampling is based on an approximation of the box filtering technique and is directed to avoiding the computation of the area overlap of the (box reconstructed) footprint of a texel with the mapped footprint of a pixel. This process is approximated using only 1D computations over the midline: a 1D blur (low pass) filter is applied to the texels with the filter footprint size depending on the local shear factor (resulting in more blur with more shear). The shear factor may be received from the texture space rasterizer TS. The blur may be applied both in the first (e.g. horizontal) pass and in the second (e.g. vertical) pass.

Figure 1:
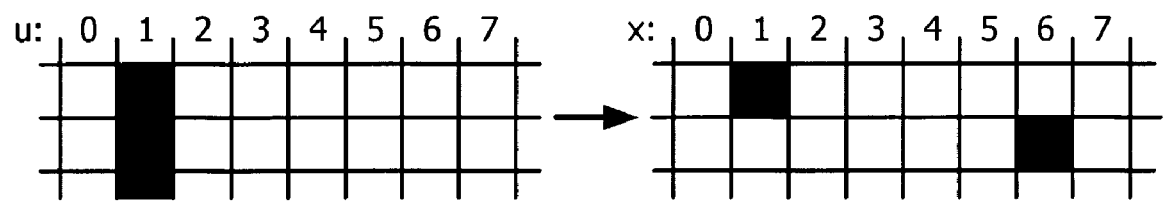
FIG. 1 shows an illustration of aliasing due to shear caused by texture mapping.
Figure 2:
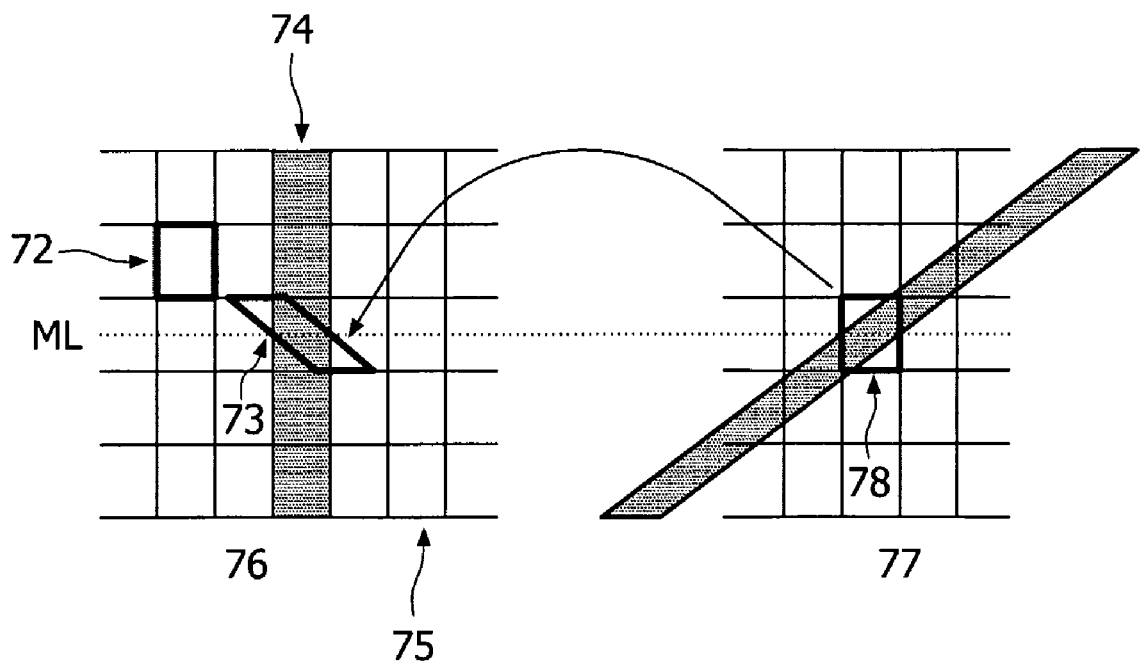
FIG. 2 shows an illustration of an output pixel footprint mapped to an input image.
Figure 4:
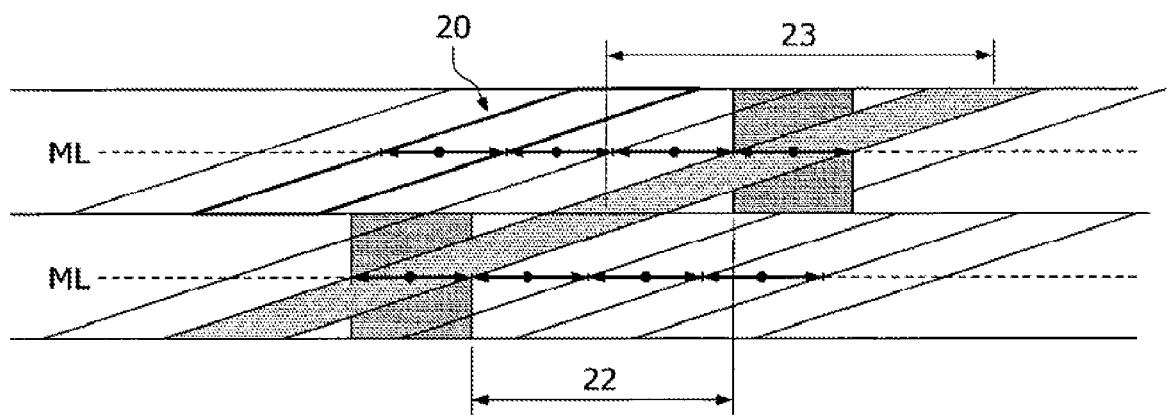
FIG. 4 shows a detailed illustration of the right hand side of FIG. 2 with a 1D filtering.

FIG. 4 shows a detailed view of the right side of FIG. 2 but with the footprint of the box reconstructed texels mapped in output space. If merely the texel's 1D footprint on the midline ML (indicated with the double sided arrow) would be mapped to the output space, a discontinuous diagonal line would be obtained, only represented with the indicated dark grey separate square areas. If the transformation with shear is applied on the 2D reconstruction footprint of the texels of the vertical line, a continuous parallelogram 20 consisting of the mapped footprints of these texels is obtained that represents the mapped line. The shear due to the $1^{st}$ pass is indicated by the distance 23. To determine the horizontal shear factor of a given texel, the rasteriser can determine the location in the screen of half a pixel spacing above (this location was computed when rasterizing the previous line) and half a pixel spacing below the midline. The horizontal distance 23 of the two screen locations corresponds to the horizontal shear factor. The vertical shear factor can be determined by looking at the vertical distance of the screen locations corresponding to two locations that are half a pixel spacing to the left and half a pixel spacing to the right of the midline. The distance 22 represents the gap between non adjacent mapped filter footprints if the mapping would only be based on the 1D filter footprint on the midline.

Figure 5:
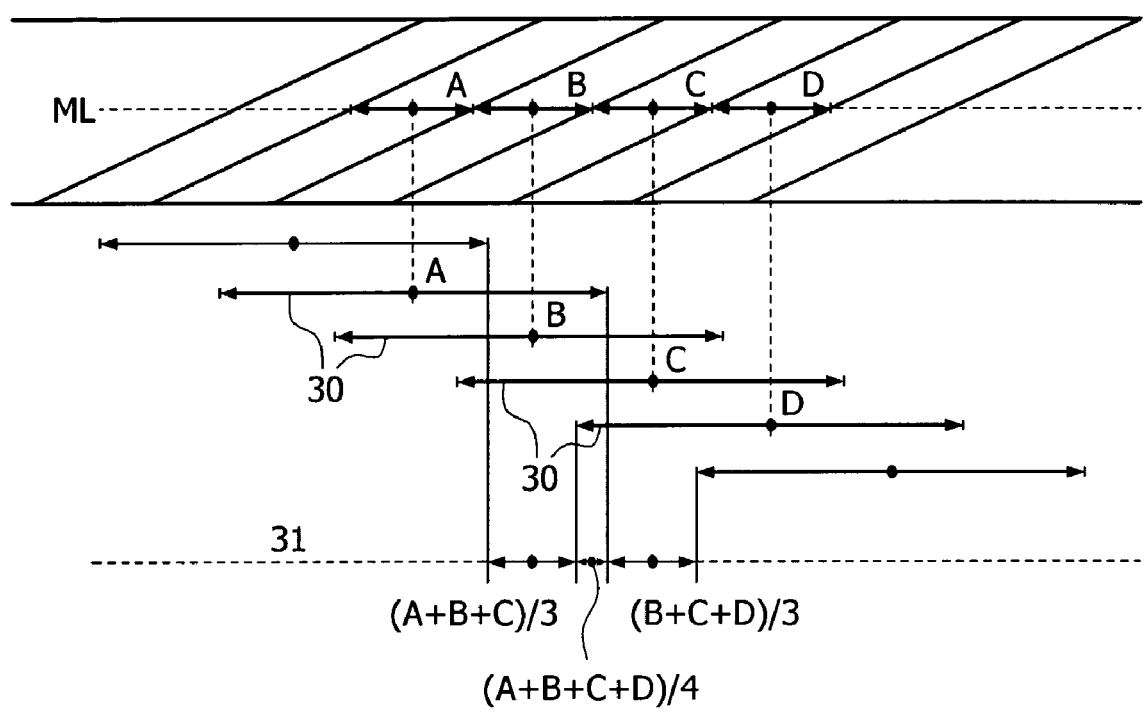
FIG. 5 shows an illustration of an improved 1D filtering to approximate a 2D filter footprint.

FIG. 5 shows a representation of an improved texel filter footprint. Here, the concept of "stretched texels" is implemented and constitutes an improved approximation of the mapped sheared 2D footprint of the texel using 1D filtering. The 1D footprint of the texels over the midline ML are stretched according to the local shear factor. In particular, four 1D footprints on the midline A, B, C, D of four texels are shown in FIG. 5. The 1D footprints are stretched resulting in four stretched texels 30. The stretched texels have the same length as the local shear factor. Additionally, an averaging of the overlapping stretched texels may be performed to deliver the desired anti-aliased and blurred texels 31 that are forwarded to the screen space resampler. Accordingly, the averages 31 of the overlapping parts and hence the blurred texels 31 result in (A+B+C)/3, (B+C+D)3, and (A+B+C+D)/4.

However, the averaging of n stretched texels requires a delay unit which is able to contain n stretched texels. A maximum of n may be 8, so that, a maximum of 8 delay elements is used. In such a case the stretched texels may be limited to a width of 8 texel spacings. However, alternative widths of the stretched texels are also possible.

Figure 6:
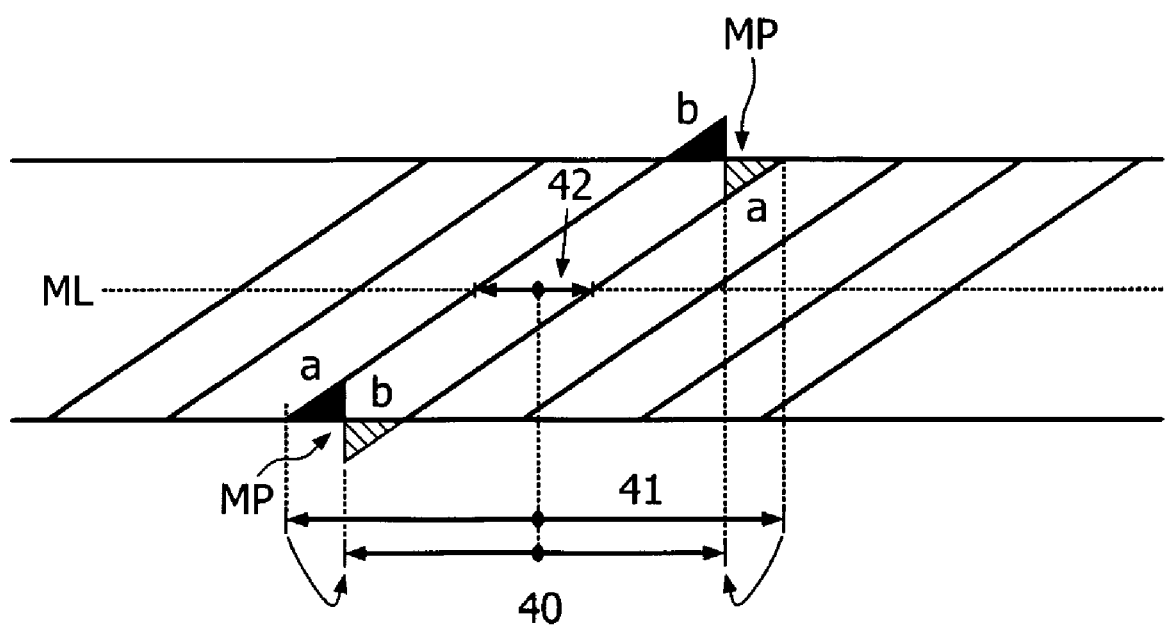
FIG. 6 shows an illustration of a shrunk footprint of FIG. 5.

FIG. 6 depicts that the footprints of FIG. 5 are shrunk. Here, a box low pass reconstruction filter for the stretched texels, i.e. a uniform distribution along the footprint, is used. The footprint of the box stretched texel is not fitted to the 2D borders 41 of the footprint directly but the footprint 40 is shrunk half a mapped texel spacing on both sides, i.e. the resulting 1D footprint extends between the sheared midpoints MP of the footprint. Accordingly, areas a are excluded for contribution, but these are equal to areas b which are included for contribution. The 1D footprint 42 over the midline ML is stretched to the 1D footprint 41 according to the local shear factor and the final 1D footprint 40 is shrunk to extend between the midpoints of the 2D footprint.

Figure 7:
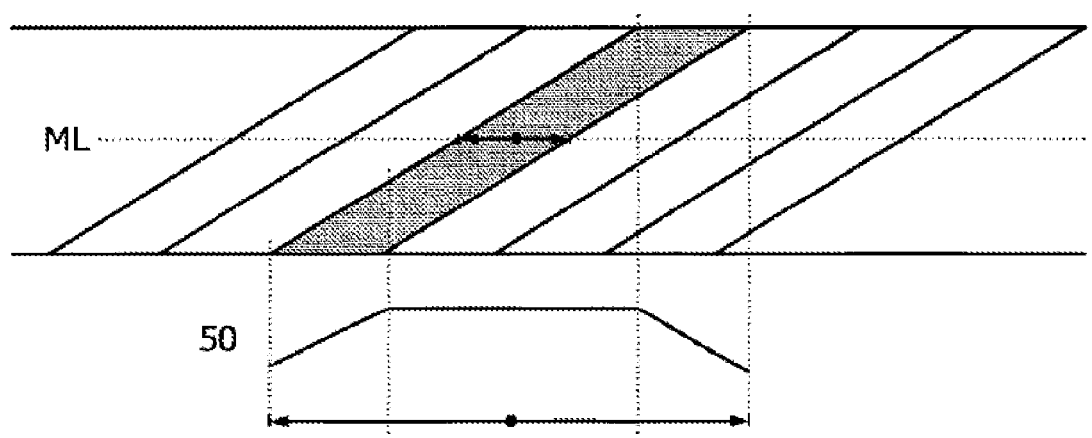
FIG. 7 shows an illustration of a weighting of the footprint of FIG. 6

FIG. 7 shows an illustration of an alternative filter for the 2D footprint. The stretched texel 50 is weighted with a linear weighting at its ends. With such a weighted filter a better approximation of the contribution of the 2D footprint along the 1D footprint 51 of the stretched texel is achieved.

Alternatively to the above box reconstruction filter, principle of shear anti-aliasing may also be used for wider (higher order) reconstruction filters. However, the averaging of the stretched texels (now weighted along their footprint with the higher order filter) will become more difficult.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. A computer graphics processor, having a forward mapping renderer, comprising:
   a texture space rasterizer configured to rasterize a primitive in texture space,
   a color generating unit configured to determine the color of the output of the texture space rasterizer and configured to forward a color sample along with coordinates,
   a 2-pass screen space resampler configured to resample the color sample determined by the color generating unit, and
   at least one one-dimensional blur filter unit associated to at least one pass of said 2-pass screen space resampler configured to perform a one-dimensional blur filtering before performing said at least one pass, wherein the at least one one-dimensional blur filter unit comprises a first one- dimensional blur filter unit and a second one-dimensional blur filter unit, and said first and second blur filter units have respective footprints with a size depending on a corresponding shear factor.

2. The computer graphics processor according to claim 1, wherein said 2-pass screen space resampler comprises a first pass screen space resampler and a second pass screen space resampler,
   wherein said first one-dimensional blur filter unit is arranged before said first pass screen space resampler and said second one-dimensional blur filter unit is arranged before said second pass screen space resampler.

3. Computer graphics processor according to claim 2, wherein
   said first and second blur filter units are box low pass filters.

4. The computer graphics processor according to claim 2, wherein
   said first and second blur filter units are low pass filters each having a weighted footprint including a linear weighting at each end of a texel.

5. The computer graphics processor according to claim 1, wherein
   said texture space rasterizer is adapted to determine said corresponding shear factor.

6. The computer graphics processor according to claim 1, further comprising:
   a delay unit configured to store a plurality of stretched texels and further configured to perform an averaging of overlapping stretched texels in order to determine blurred texels.

7. A method of rendering images based on a forward mapping rendering within a computer graphics processor, the method comprising:
   rasterizing a primitive in texture space,
   determining the color of the output of the rasterizing step and forwarding a color sample along with coordinates,
   resampling, via a 2-pass screen space resampler, the color sample, and performing at least one one-dimensional blur filtering before performing at least one pass of resampling, wherein performing the at least one one-dimensional blur filtering step comprises a first one-dimensional blur filtering and a second one-dimensional blur filtering, and said first and second blur filtering are performed based on one-dimensional blur filters having respective footprints with a size depending on a corresponding shear factor.

8. The method according to claim 7, wherein performing the at least one one-dimensional blur filtering comprises:
   a first one-dimensional blur filtering and a second one-dimensional blur filtering,
   wherein said resampling comprises a first pass screen space resampling and a second pass screen space resampling,
   wherein said first one-dimensional blur filtering is performed before said first pass screen space resampling and said second one-dimensional blur filtering is performed before said second pass screen space resampling.

9. The method according to claim 7, wherein said corresponding shear factor is determined in said rasterizing step.

10. The method according to claim 7, further comprising:
    storing a plurality of stretched texels to perform an averaging of overlapping stretched texels in order to determine blurred texels.

11. The method according to claim 7, wherein performing the at least one one-dimensional blur filtering step comprises:
    a first one-dimensional blur filtering, and
    a second one-dimensional blur filtering,
    wherein said first and second blur filtering are performed on the basis of box low pass filters.

12. The method according to claim 7, wherein performing the at least one one-dimensional blur filtering step comprises:
    a first one-dimensional blur filtering, and
    a second one-dimensional blur filtering,
    wherein said first and second blur filtering are performed on the basis of a low pass filter having a weighted footprint including a linear weighting at each end of a texel.

13. A non-transitory computer-readable medium encoded with a computer program configured to perform a method according to claim 7.

14. One or more non-transitory computer readable media containing computer readable instructions for rendering images, the computer readable instructions operable by one or more processors to execute data processing steps comprising:
    rasterizing, via a rasterizer, a primitive in texture space;
    determining, via a color generating unit, the color of the output of the texture space rasterizer;
    forwarding, via the color generating unit, the color sample along with coordinates;
    resampling, via a 2-pass screen space resampler, the color sample determined by the color generating unit;
    performing at least one pass, via at least a one-dimensional blur filter unit, of the 2-pass screen space resampler; and
    storing a plurality of stretched texels to perform an averaging of overlapping stretched texels in order to determine blurred texels.

* * * * *